United States Patent [19]

Haddad et al.

[11] Patent Number: 4,654,060
[45] Date of Patent: Mar. 31, 1987

[54] CLOSED CYCLONE FCC CATALYST SEPARATION METHOD AND APPARATUS

[75] Inventors: James H. Haddad, Princeton Junction; Hartley Owen, Belle Mead; Klaus W. Schatz, Skillman, all of N.J.

[73] Assignee: Mobil Oil Corporation, New York, N.Y.

[21] Appl. No.: 670,856

[22] Filed: Nov. 13, 1984

Related U.S. Application Data

[62] Division of Ser. No. 612,177, May 21, 1984, Pat. No. 4,502,947.

[51] Int. Cl.$^4$ .......................... B04C 11/00; B01J 8/24
[52] U.S. Cl. ..................................... 55/424; 208/153; 208/161; 422/144; 422/145; 422/147; 422/214; 55/426
[58] Field of Search ............... 422/144, 145, 147, 214; 208/153, 161; 55/424, 426, 459 R, 457

[56] References Cited

U.S. PATENT DOCUMENTS

| | | |
|---|---|---|
| 2,464,812 | 3/1949 | Johnson . |
| 2,612,433 | 9/1952 | Nicolai et al. . |
| 2,656,242 | 10/1953 | Matheson . |
| 2,838,063 | 6/1958 | Weits et al. . |
| 2,862,786 | 6/1955 | Trainer . |
| 2,901,331 | 8/1959 | Held et al. . |
| 3,007,778 | 11/1961 | Wood et al. . |
| 3,085,382 | 4/1963 | Finney et al. ........................ 55/457 |
| 3,152,066 | 10/1964 | Wickham ............................ 208/163 |
| 3,169,842 | 2/1965 | Streete et al. ........................ 55/457 |
| 3,212,240 | 10/1965 | Streete .................................. 55/457 |
| 3,355,380 | 11/1967 | Luckenbach . |
| 3,386,588 | 6/1968 | Ades .................................... 55/457 |
| 3,661,799 | 5/1972 | Cartmell . |
| 3,667,196 | 6/1972 | Koenecke .............................. 55/312 |
| 3,677,715 | 7/1972 | Morrison et al. . |
| 3,826,738 | 7/1974 | Zenz . |
| 3,964,876 | 6/1976 | James ................................. 208/115 |
| 4,043,899 | 8/1977 | Anderson et al. ................... 208/161 |
| 4,066,533 | 1/1978 | Myers et al. . |
| 4,070,159 | 1/1978 | Myers et al. . |
| 4,219,407 | 8/1980 | Haddad et al. . |
| 4,351,275 | 9/1982 | Bhojwani et al. . |
| 4,356,151 | 10/1982 | Woebcke et al. . |
| 4,394,349 | 7/1983 | Cartmell .............................. 422/147 |
| 4,446,107 | 5/1984 | Bryan et al. ......................... 422/147 |

*Primary Examiner*—Barry S. Richman
*Assistant Examiner*—William R. Johnson
*Attorney, Agent, or Firm*—Alexander J. McKillop; Michael G. Gilman; Dennis P. Santini

[57] ABSTRACT

An apparatus for fluid catalytic cracking (FCC) wherein the output of a reactor riser zone is fed to a riser cyclone separator, a primary cyclone separator, and secondary cyclone separators, connected in series within a single reactor vessel. The riser cyclone separator is connected to the primary cyclone separator by a conduit, which prevents random post-riser thermal cracking of the hydrocarbons after they exit the riser cyclone separator. The conduit contains an annular port to allow stripping gas to enter the conduit to improve the separation of hydrocarbons from catalyst. Catalyst separated in the riser cyclone separator drops through a riser cyclone dipleg and passes through a dipleg seal which comprises a seal pot or catalyst held around the dipleg. The conduit is formed by two overlapping parts, one having a larger diameter than the other to form the annular port and packing or spacers may be used to align and space the overlapping parts.

13 Claims, 10 Drawing Figures

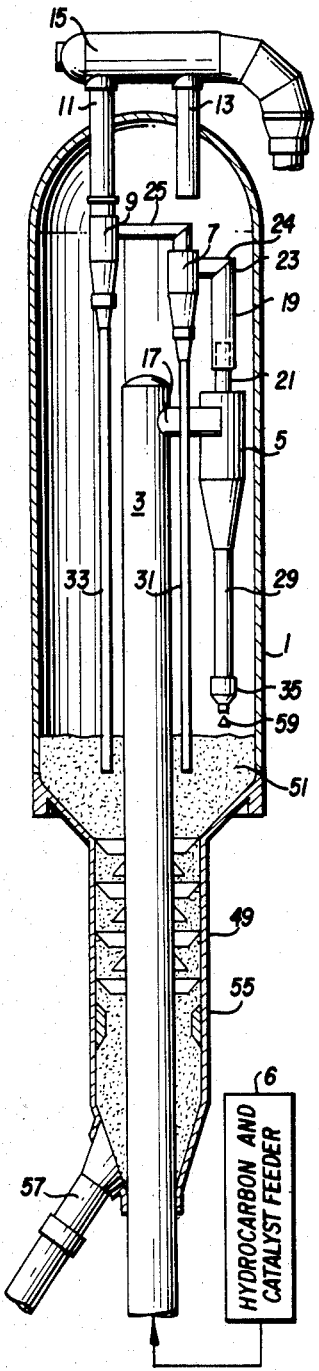
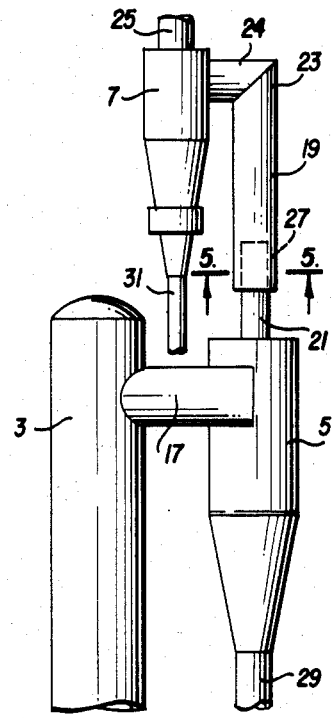
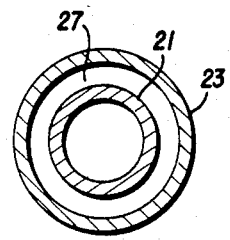
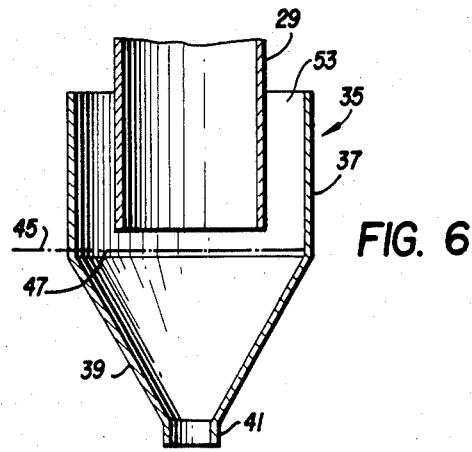
FIG. 3
FIG. 4
FIG. 5
FIG. 6

CLOSED CYCLONE FCC CATALYST SEPARATION METHOD AND APPARATUS

CROSS-REFERENCE TO RELATED APPLICATION

This application is a division of U.S. Pat. No. 4,502,947, application Ser. No. 612,177, filed May 21, 1984.

BACKGROUND OF THE INVENTION

1. Field of the Invention

This invention relates to a method and apparatus for the separation of a catalyst phase from a gas suspension phase in a fluidized catalytic cracking unit (FCC). More particularly, it relates to an improved method and apparatus for separating the catalyst phase from the gas suspension phase, as the gas suspension phase is discharged from a riser converion zone outlet, to minimize or substantially eliminate post-riser conversion zone cracking.

2. Discussion of the Prior Art

The field of catalytic cracking, particularly fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered requiring refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is transferred in suspended or dispersed phase condition generally upwardly through one or more riser conversion zones (FCC cracking zones) providing a hydrocarbon residence time in each conversion zone in the range of 0.5 to about 10 seconds, and usually less than about 8 seconds. High temperature riser hydrocarbon conversions, occurring at temperatures of least 1000° F. or higher and at 0.5 to 4 seconds hydrocarbon residence time in contact with the catalyst in the riser, are desirable for some operations before initiating separation of vaporous hydrocarbon product materials from the catalyst. Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the hydrocarbon conversion step. The entrained hydrocarbons are subjected to further contact with the catalyst until they are removed from the catalyst by mechanical means and/or stripping gas in a separate catalyst stripping zone. Hydrocarbon conversion products separated from the catalyst and stripped materials are combined and passed to a product fractionation step. Stripped catalyst containing deactivating amounts of carbonaceous material, hereinafter referred to as coke, is then passed to a catalyst regeneration operation.

Of particular interest has been the development of methods and systems for separating catalyst particles from a gas suspension phase containing catalyst particles and vaporous hydrocarbon product materials, particularly the separation of high activity crystalline zeolite cracking catalysts, under more efficient separating conditions so as to reduce overcracking of hydrocarbon conversion products and promote the recovery of desired products of a hydrocarbon conversion operation. Cyclonic equipment is now typically used for efficient separation of fluidizable catalyst particles from the gas suspension phase. However, present day cyclonic equipment often permits an undesirable extended residence time of the product vapor within a large reactor vessel. This extended residence time reduces the desired product yield by as much as 4 percent through nonselective thermal cracking. Recent developments in this art have been concerned with the rapid separation and recovery of entrained catalyst particles from the gas suspension phase.

Various processes and mechanical means have been employed heretofore to effect rapid separation of the catalyst phase from the hydrocarbon phase at the termination of the riser cracking zone, to minimize contact time of the catalyst with cracked hydrocarbons. Several of these are discussed below.

Cartmell, U.S. Pat. No. 3,661,799, discloses a process for catalytic conversion of petroleum feedstocks wherein the fluidized mixture of the cracking catalyst and cracked feedstock leaves a vertically-disposed reactor section and enters a cyclone separator, placed in a separate stripper vessel, through a conduit. The conduit contains an annulus which allows an inert stripping gas and associated stripped vapors to pass into the cyclone separator.

Anderson et al, U.S. Pat. No. 4,043,899, discloses a method for rapid separation of a product suspension, comprising fluidized catalyst particles and the vaporous hydrocarbon product phase, by discharging the entire suspension directly from the riser conversion zone into a cyclone separation zone. The cyclone is modified to include a separate cyclonic stripping of the catalyst separated from the hydrocarbon vapors. In the method of Anderson et al, the cyclone separator is modified to include an additional downwardly extending section comprising a lower cyclone stage. In this arrangement, catalyst separated from the gasiform material in the upper stage, slides along a downwardly sloping baffle to the lower cyclone where stripping steam is introduced to further separate entrained hydrocarbon products from the catalyst recovered from the upper cyclone. The steam and the stripped hydrocarbons are passed from the lower cyclone through a concentric pipe where they are combined with the hydrocarbon vapors separated in the upper cyclone. The separated and stripped catalyst is collected and passes from the cyclone separator by conventional means through a dipleg. This process requires that the entire volume of catalyst, gasiform phase and stripping steam pass through the cyclone separator, which means that this equipment must be designed to efficiently handle not only a large vapor volume, but also a large quantity of solid particles.

Myers et al, U.S. Pat. No. 4,070,159, provides a separation means whereby the bulk of catalyst solids is discharged directly into a settling chamber without passing through a cyclone separator. In this apparatus, the discharge end of the riser conversion zone is in open communication with the disengaging chamber such that the catalyst discharges from the riser in a vertical direction into the disengaging chamber which is otherwise essentially closed to the flow of gases. The cyclone separation system is in open communication with the riser conversion zone by means of a port located upstream from, but near, the discharge end of the riser conversion zone. A deflector cone mounted directly above the terminus of the riser causes the catalyst to be directed in a downward path so as to prevent the catalyst from abrading the upper end of the disengaging vessel. The cyclone separator is of the usual configuration employed in a catalytic cracking unit to separate entrained ctalyst particles from the cracked hydrocarbon products so that the catalyst passes through the dipleg of the cyclone to the body of the catalyst in the lower section of the disengaging vessel, and the vaporous phase is directed from this vessel to a conventional fractionation unit. There is essentially no net flow of gases within the disengaging vessel beyond that resulting from a moderate amount of steam introduced to strip the catalyst residing in the bottom of the disengaging vessel.

Haddad et al, U.S. Pat. No. 4,219,407, discloses the separation of the catalyst from the gasiform cracked products in a fashion which permits effective steam stripping of the catalyst. The suspension of catalyst and gasiform material is discharged from the riser conversion zone outwardly through radially extending passageways, or arms, which terminate in a downward direction. Catalyst stripping zones, or strippers, are located beneath the terminus of each of the radially extending passageways. Each stripper consists of a vertical chamber open at the top and the bottom with downwardly sloping baffles located within the chamber so as to cause the catalyst to flow in a discontinuous manner countercurrently to upwardly flowing stripping stream introduced at the lower end of the stripping chamber. The radially extending arms are each provided with a curved inner surface and confining sidewalls to impart a cyclonic concentration of catalyst particles promoting a forced separation thereof from the hydrocarbon vapors. The separation of the catalyst from the vapors is basically achieved through rapid changes in the direction of flow of the catalyst and the vapors. Thus the cyclonic collection and concentration of catalyst particles is used to reverse the flow of separated catalyst such that it concentrates as a downwardly confined stream which discharges generally downwardly and into the open upper end of the catalyst stripping chamber. A vapor disengaging space is provided between the discharge end of the radially extending arms and the top of the catalyst strippers to promote the rapid removal of separated vapors from the catalyst. The separated vapors pass upwardly through the disengaging vessel to the open inlet of a cyclone separator which removes entrained catalyst from the gasiform material for return through a dipleg to the body of steam stripped catalyst while the separated vaporous material passes to a fractionation unit. The hydrocarbon product, as it passes within the disengaging vessel from the discharge of the radially extending arms to the cyclone separator, travels in a random fashion and is exposed to catalytic reaction temperatures which may cause undesirable side reactions and thermal cracking before these vapors enter a quench zone in the main fractionator of the fluid cracking unit.

Haddad et al, in U.S. Pat. No. 4,404,095, filed July 22, 1982, the disclosure of which is incorporated herein by reference, disclose an FCC reactor comprising a riser with radially extending sidearms as the first catalyst-hydrocarbon separation means. The sidearms force the suspension of the catalyst and the hydrocarbons to suddenly change the direction of flow from the vertical to the horizontal thereby forcing preliminary separation of the gaseous hydrocarbons from the solid catalyst particles. The catalyst particles fall in a downward direction, to a stripping means, while the hydrocarbons, with some entrained catalyst particles, proceed to a secondary separation means, such as a cyclone. The sidearms and the secondary separation means are enclosed by a vertical conduit to prevent random uncontrolled thermal cracking of the hydrocarbons. However, the vertical conduit provided to send hydrocarbons from the side arms to the secondary separation means may not accommodate radial and longitudinal thermal expansion of the separation means.

SUMMARY OF THE INVENTION

It is a primary object of this invention to provide an improved process and apparatus for rapidly separating cracking catalyst from a hydrocarbon vapor/catalyst particle suspension in a fluid catalytic cracking (FCC) process.

It is another object of this invention to provide a method and an apparatus for separating cracking catalyst from hydrocarbon vapor/catalyst suspension, whereby the length of time the suspension is subjected to high temperature after separation from the bulk of the catalyst is minimized so as to reduce overcracking of the cracked products.

It is another object of this invention to provide an apparatus for admitting a stripping gas to a hydrocarbon vapor/catalyst particle suspension, wherein a conduit between first and second catalyst separating cyclones has an annular port therein for admitting the stripping gas to the suspension.

It is another object of this invention to provide an apparatus for sealing the bottom opening of a cyclone dipleg by holding a bed of catalyst around the dipleg opening, while allowing catalyst to flow out of the dipleg.

It is another object of this invention to provide a method for fluid catalytic cracking in which a hydrocarbon vapor/catalyst particle suspension passes directly from a riser into a series of cyclonic separators, which separate the catalyst particles from the suspension and which add stripping gas to the suspension as it passes from one cyclonic separator to the next.

It is another object of this invention to provide a cyclonic separation apparatus which better withstands thermal expansion.

It is another object of this invention to provide a method and apparatus for aligning concentric conduits passing a hydrocarbon vapor/catalyst particle suspension so that they better withstand thermal expansion.

It is another object of this invention to provide an improved method for converting an open cyclone FCC system to a closed cyclone FCC system which requires a minimum of expense and downtime.

In its method aspects, the invention achieves the foregoing objects by an FCC method comprising the steps of passing a suspension of catalyst and hydrocarbon vapors through an FCC cracking zone, such as an FCC riser, passing the cracked hydrocarbons through a first enclosed conduit into a riser (first) cyclone which separates catalyst from the suspension, further passing the suspension from the first cyclone to a second cyclone through a second conduit comprising a gas tube and an inlet duct to the second cyclone, the inlet duct having a larger diameter than the gas tube, thus forming a first annular port and passing a stripping gas from a reactor vessel through the annular port to form a mixture with the cracked hydrocarbon vapor/catalyst particle suspension.

The method may also include the steps of passing the suspension through subsequent cyclones and finally to a fractionation zone. In the method of the invention, separated catalyst passes through cyclone diplegs to a catalyst stripping zone. Since the pressure inside the riser cyclone is slightly higher than the pressure in the reactor vessel, the catalyst passes through a riser cyclone dipleg sealing means before entering the catalyst stripping zone.

In its apparatus respects, the invention comprises: a reactor vessel housing a riser hydrocarbon conversion zone, which is an elongated tubular conduit having a downstream end which terminates in the reactor vessel; means for feeding a suspension of hydrocarbon and catalyst into the riser conversion zone to produce a mixture of catalyst and cracked hydrocarbon, which exits from the downstream end of the riser conversion zone; a riser (first) cyclone connected to a downstream end of said riser conversion zone by a first enclosed conduit, a primary (second) cyclone connected to an outlet of the riser cyclone by a second conduit, which comprises a gas tube and an inlet duct to the primary cyclone, which has a larger diameter than the gas tube to form an annular port between them, the first conduit completely separating the suspension passing therethrough from the atmosphere of the reactor vessel. The apparatus of the invention may also include means for conducting cracked hydrocarbons from the primary cyclone and reactor vessel out of the reactor vessel. A catalyst stripping zone is also located within the reactor vessel and dipleg means are provided for conducting catalyst from the cyclones to the catalyst stripping zone. The annular port allows at least a portion of a stripping gas from the catalyst stripping zone to pass directly into the second conduit means. Packings and/or spacers may also be provided for aligning the gas tube and inlet duct. A seal for the riser cyclone is preferably provided by surrounding a bottom opening of the cyclone dipleg with a bed of catalyst, while allowing catalyst to flow out of the dipleg and through the sealing means.

The invention, in both its method and apparatus aspects, can be configured as an original installation, or as a retrofit to an existing open cyclone FCC reactor system.

BRIEF DESCRIPTION OF THE DRAWINGS

FIG. 3 is a schematic representation of a side view of a fluid catalytic cracking (FCC) reactor of another embodiment of the present invention;

FIG. 4 is an illustration of the detail of the conduit between the riser cyclone and the primary cyclone;

FIG. 5 is an illustration of the detail of a section 5—5 in FIG. 4;

FIG. 6 is an enlarged sectional view of the seal pot shown in FIG. 3;

DETAILED DESCRIPTION OF THE INVENTION

As well known, a fluid catalytic cracking (FCC) process employs a catalyst in the form of very fine particles which act as a fluid when aerated with a vapor. The fluidized catalyst is circulated continuously between a reaction zone and a regeneration zone and acts as a vehicle to transfer heat from the regenerator to the hydrocarbon feed and reactor. The FCC process is valuable to convert heavy hydrocarbons into more valuable gasoline and lighter products.

Figures 1, 2:
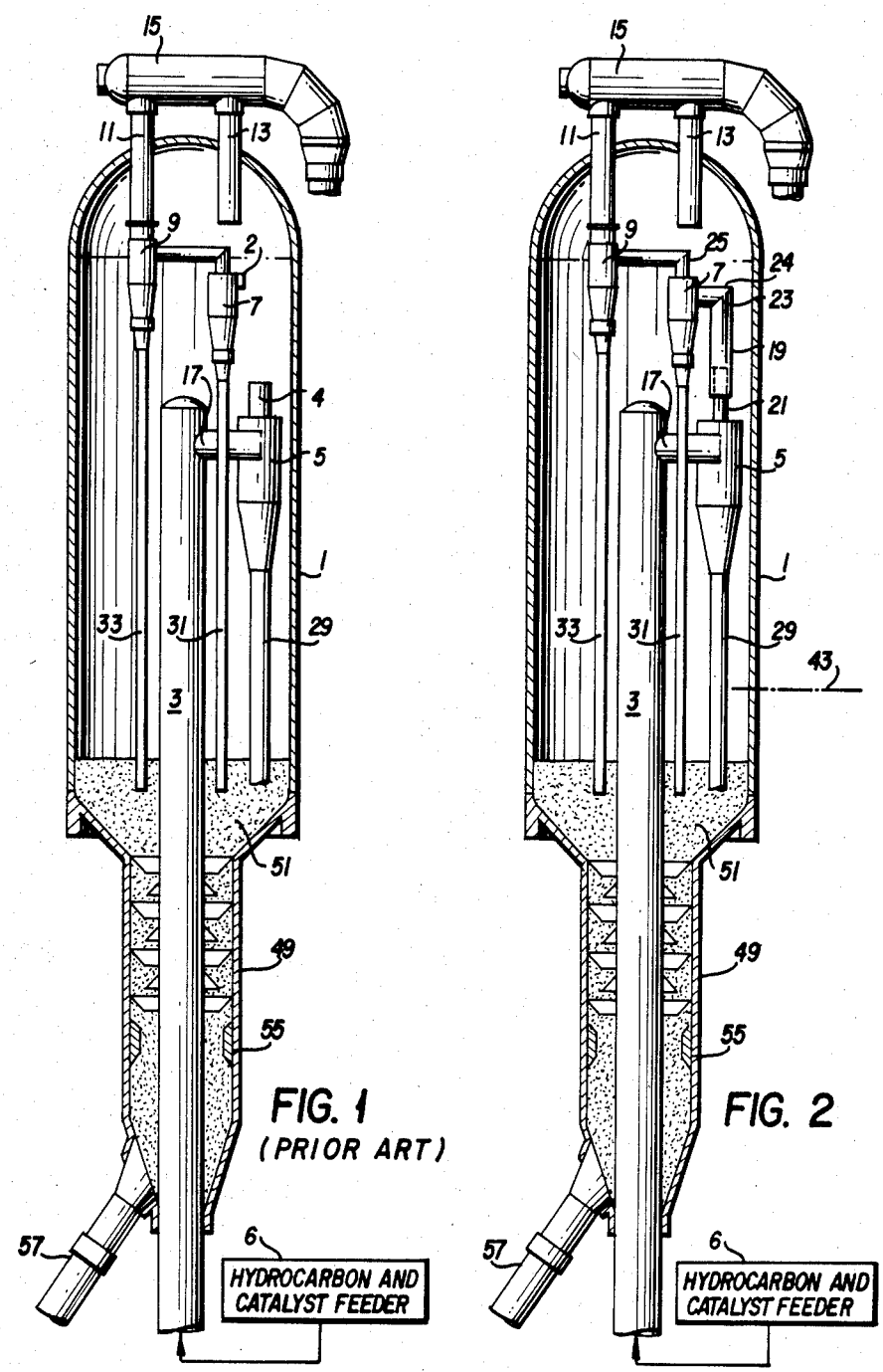
FIG. 1 is a schematic representation of a side view of a fluid catalytic cracking (FCC) reactor of the prior art.
FIG. 2 is a schematic representation of a side view of a fluid catalytic cracking (FCC) reactor of one embodiment of the present invention.
Figure 7:
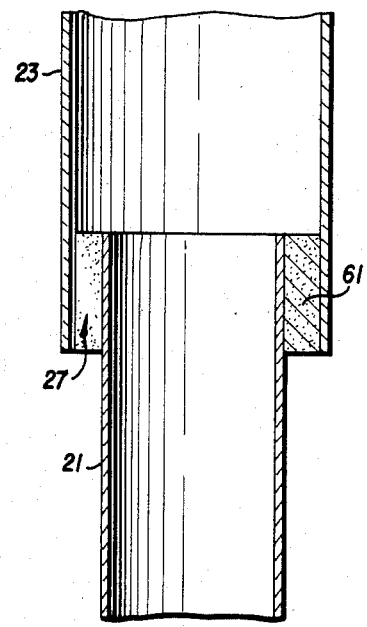
FIG. 7 is an enlarged side sectional view of the conduit between the riser cyclone and primary cyclone showing a packing used to space and align concentric conduit portions.
Figure 8:
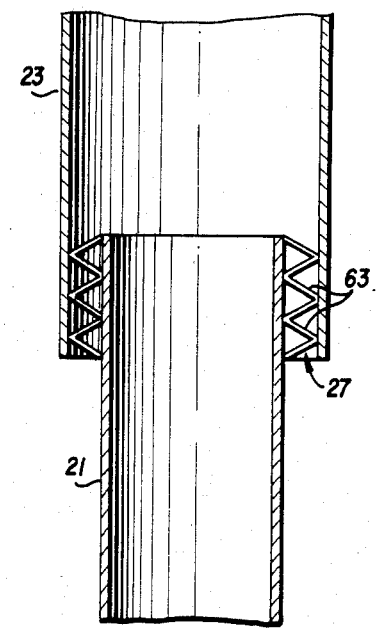
FIG. 8 is an enlarged side sectional view of the conduit between the riser cyclone and primary cyclone showing mechanical spacers used to space and align concentric conduit portions.
Figure 7A:
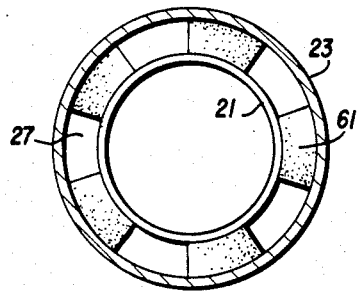
FIG. 7A is a top plan view of the FIG. 7A conduit.
Figure 8A:
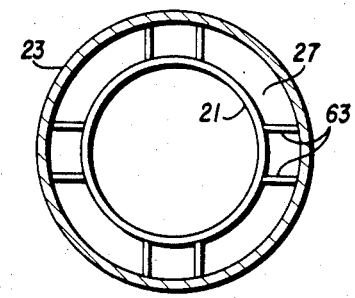
FIG. 8A is a top plan view of the FIG. 8 conduit.

The prior art, as shown in FIG. 1, uses an open reactor configuration in which catalyst particles and hydrocarbon feed, which together pass as a comingled mixture through a riser 3, enter a riser cyclone 5 via conduit 17, with the catalyst being separated in the cyclone 5 from a suspension of hydrocarbon vapor/catalyst particles and sent to the bottom of a reactor vessel 1. The hydrocarbons separated in cyclone 5 pass overhead into the reactor 1 vessel space, and from there through a second set of cyclones 7,9 which further remove catalysts entrained in the gas suspension. In this system, any hydrocarbons exiting overhead from the riser cyclone 5 to the reactor vessel tended to remain in the reactor vessel for too long, causing overcracking and loss of control of the cracked products.

The present invention is directed to a closed reactor method and apparatus, in which catalyst particles remaining in the gas suspension exiting overhead from the riser cyclone 5 are directly fed into subsequent cyclones 7,9 for quick removal of the catalysts, so that the hydrocarbons may be stripped away from the catalyst and exit the reactor vessel through conduit 11 before they have time to overcrack. This overcracking is presently a problem because of recently developed catalysts which have very high reactivity as opposed to earlier catalysts. Thus, in the invention, a direct conduit 19 (FIG. 2) connects the riser cyclone to the first of any subsequent series connected cyclones which may be located within the FCC reactor.

It is advantageous to mix a catalyst stripping gas from the reactor vessel with the gas suspension which exits overhead from the riser cyclone 5 as an aid in removing hydrocarbons from the catalyst materials. To achieve this, the direct conduit 19 has an opening formed to admit stripper gas therein. The opening is formed by making the conduit in at least two parts. The first part is a gas extension tube 21 which extends vertically from the overhead of the riser cyclone 5, and the second is an inlet duct 23 for a next-in-line primary cyclone 7. The inlet duct has a larger diameter than the gas extension tube so a first annular port is formed between the two parts, and stripping gas passes through the annular port.

To maintain the seal required for a closed cyclone system, because the pressure in the riser cyclone 5 is higher than that of the reactor vessel 1, a sealing means is provided for an opening at a bottom of the riser cyclone 5 dipleg 29.

The invention will now be described in greater detail in connection with specific embodiments thereof illustrated in FIGS. 2–8A. These embodiments, however, are not to be construed as a limitation on the scope of the invention, but are merely provided by way of exemplary illustration.

Referring to FIG. 2, the reactor vessel 1 is provided with a conventional catalyst stripping section 49 in a lower bottom portion of the vessel. The reactor vessel 1 surrounds the upper terminal end of a riser 3 (also referred to as a riser conversion zone), to which are attached a riser cyclone 5, a primary cyclone 7, and secondary cyclone 9. The riser cyclone 5 is attached to the riser 3 by means of a riser conduit 17, which is an enclosed conduit. The riser cyclone 5 in turn is connected to the primary cyclone 7 by means of the riser cyclone overhead conduit 19. The primary cyclone 7 is attached to the secondary cyclone 9 by a conventional enclosed conduit 25. Overhead gas from the secondary cyclone 9, or other secondary cyclones in parallel (not shown), exits the reactor vessel 1 by means of an overhead conduit 11 for cyclone 9, or conduit 13, for a parallel set of cyclones. The gases which exit the reactor through the overhead conduit 11, and the overhead conduit 13, are combined and exit through the reactor overhead port 15. Catalyst particles separated from a suspension of hydrocarbon vapor and catalyst particles by the cyclones 5,7,9 drop through cyclone diplegs 29, 31, and 33 respectively and feed the reactor stripper zone 49, which removes hydrocarbons adhering to said catalyst. It will be apparent to those skilled in the art that although only one series connection of cyclones 5,7,9 are shown in the embodiment of FIG. 2, more than one series connection and/or more or less than three consecutive cyclones in a series connection could be used.

The riser cyclone overhead conduit 19 provides a passageway for catalysts to directly travel from the riser cyclone 5 to the primary cyclone 7 without entering the reactor vessel 1 atmosphere. However, an annular port 27 (FIGS. 4, 5, 7, 7A, 8, 8A) is provided to admit stripping gas from the reactor vessel 1 into the conduit 19 to aid in separating catalyst from hydrocarbons adhering thereto. As illustrated by FIG. 4, the conduit 19 comprises two parts, a gas tube extension 21 and an inlet duct 23 of the primary cyclone 7. The inlet duct 23 is of greater diameter than the gas tube extension 21. As a consequence, annular port 27 is formed when the ends of the gas tube extension 21 and inlet duct 23 overlap. FIG. 5 shows in detail a top view of the gas tube extension 21, concentric with the inlet duct 23 of the primary cyclone 7. As shown in FIG. 4, the annular port may be located in a vertical portion of the conduit 19, but the annular port could also be located in a horizontal portion 24. The annular port should be dimensioned to have an area which allows the stripping gas to pass through the annular port at a velocity between 5–100 feet per second.

The principal purpose of conduits 17, 19, 25 and 11 is to provide a direct passage of the cracked hydrocarbons from the riser 3 to and through the riser cyclone 5, the primary cyclone 7, and the secondary cyclone 9, which limits the time the cracked hydrocarbons are exposed to elevated cracking temperatures. Otherwise, the cracked hydrocarbons, as in the FIG. 1 prior art apparatus, would pass randomly through the upper portion of the reactor vessel 1 to the cyclone separators which would provide additional opportunity for non-selective thermal cracking of the hydrocarbons and a lowering of the product yield. Thus, with the invention, the hydrocarbons can be quenched and fractionated in a controlled manner in the main fractionator (downstream of overhead port 15) of the processing unit, thereby limiting undesirable thermal overcracking. With the invention, the separation of catalyst from carbonaceous materials is achieved efficiently, while at the same time, the length of time that the gaseous materials are subjected to high cracking reaction temperatures after separation from the catalyst is minimized.

The separated catalyst from cyclones 5, 7 and 9 pass through respective diplegs 31 and 33 and are discharged therefrom after a suitable pressure is generated within the diplegs by the buildup of the catalyst. The catalyst falls from the diplegs into a bed of catalyst 51 therebelow. Within catalyst bed 51 is a conventional stripping section 49, where the catalyst in bed 51 is contacted with a stream of gas such as steam, flowing countercurrently to the direction of flow of the catalyst. The gas is introduced into the lower portion of the stripping section 49 by one or more conventional conduits 55. Stripped catalyst is removed by a conduit 57 for passage to either a catalyst regeneration zone or a second stage of hydrocarbon conversion zone, depending on the activity and the amount of carbonaceous material, e.g., coke, deposited on the catalyst particles.

In the method and apparatus of the present invention, the pressure inside the riser cyclone 5 is slightly higher than the pressure surrounding it, therefore a seal is required on the riser cyclone dipleg 29 to preserve the principle of the closed cyclone system. The seal may be provided by extending the dipleg 29 into the catalyst bed 51, thus causing catalyst to build up around the dipleg to a selected height depending on the pressure imposed on the system. The seal of catalyst around the dipleg substantially prevents the flow of gaseous material into the dipleg. If desired, steam may be injected through a steam line 43 into the riser cyclone dipleg 29 to further aid in separating the hydrocarbon vapors from catalyst particles entering the cyclone.

In another embodiment of the invention, shown as FIGS. 3 and 6, the riser cyclone 5 may be modified to incorporate a seal pot 35, rather than extending the riser cyclone dipleg 29 into the catalyst bed 51. FIG. 6 illustrates that the seal pot 35 comprises side walls 37, a conical bin 39 attached to side walls 37, and a drain hole 41 attached at the base of the bin 39. The side walls 37 of the seal pot 35 have a larger diameter than that of the riser cyclone dipleg 29, thus forming an annular port 53 for catalyst to flow through. The drain hole 41 may be concentric with the seal pot 35 and is sized such that some catalyst overflows the pot through the annular port 53, thus providing a positive seal at all catalyst flow rates. The proper sizing is a combination of drain hole area, annular port area, wall height and bin height. An exemplary size for the seal, when used with a dipleg of 26 inches OD, is as follows: seal pot diameter 42 inches ID, wall height 30 inches, bin angle from a horizontal plane 60.

At shutdown, the seal pot 35 drains quickly and thus avoids coking-up of stagnant catalyst. The seal pot 35 can be equipped with a cone-shaped deflector 59 (FIG. 3) located beneath the drain hole 41 much like the deflectors used for conventional cyclone diplegs. As an additional precaution against coking, the seal pot 35 can also be equipped with a steam ring 47 inside at the bottom of side walls 37.

Although annular port 27 inherently accomodates thermal expansion of gas tube 21 and inlet duct 23, in some instances, it may be difficult to align the gas tube 21 with inlet duct 23 to maintain the small dimensional tolerances required for annular port 27. Therefore, to solve this potential problem, an aligning mechanism may be provided in the annular port 27, as shown in FIGS. 7, 7A, 8 and 8A. The aligning mechanism may comprise a packing 61 which partially fills the annular port 27, or mechanical spacers 63 which interconnect the gas tube 21 and inlet duct 23 and partially fill the annular port 27.

In the method of the invention, hydrocarbons and catalyst particles are introduced by feeder 6 to the upstream end of a riser 3 so that a cracked hydrocarbon exits the downstream (upper) end of the riser 3, which terminates within a reactor vessel 1. The cracked hydrocarbon and catalyst particle suspension then passes through a first conduit 17 to a riser cyclone 5, which separates catalyst particles from the suspension. The first conduit 17 is enclosed so that no stripping gas from the reactor vessel 1 enters therein. The suspension then passes through a second conduit 19, which comprises a gas tube 21 and a primary cyclone inlet duct 23. The gas tube 21 has a smaller diameter than the inlet duct 23, enabling the gas tube to be inserted into the inlet duct so that the suspension of cracked hydrocarbons and catalyst particles passes directly from gas tube 21 into inlet duct 23. In addition, stripping gas from a reactor stripping zone 49 passes into the second conduit by means of the annular port 27, which is formed where the gas tube 21 is inserted into the inlet duct 23. Then, the suspension passes through a subsequent cyclone 7 to remove remaining catalyst, and leaves the reactor through the secondary cyclone overhead conduit 11, which feeds reactor overhead port 15.

Catalyst separated from the suspension passes through cyclone diplegs 29,31,33 through a dipleg sealing means and into catalyst bed 51. The diplegs may be sealed by inserting them in the catalyst bed 51. Otherwise, the riser cyclone dipleg 29, in particular, may be sealed by a seal pot 35, which surrounds a lower opening of the dipleg 29 with a bed of catalyst. The catalyst leaves the seal pot through a drain hole 41 and an annular port 53, shown in FIG. 6. In addition, steam may enter the seal pot through an optional steam ring 47, to prevent coking of catalyst. The other cyclone diplegs 31,33 may be sealed by conventional means, such as flapper valves or by being extended into the catalyst bed 51.

The invention can also be applied as a retrofit to an existing open cyclone system, thus converting the system to a closed cyclone system. The advantage of a retrofit is that it is simple and requires a minimum of expense and reactor downtime.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended hereto.

We claim:

1. An apparatus for separating solids from a gaseous stream containing solids, comprising a cyclone separation means having a dipleg including a bottom portion and a seal pot which is concentric with said dipleg, said seal pot comprising vertical side walls, a tpo portion of said side walls overlaps said bottom portion of said cyclone dipleg and defines an annular port, a bin portion comprising vertical inwardly slanted walls attached to a lower portion of said vertical side walls and means defining at least one opening at a lower end of the bin portion.

2. An apparatus of claim 1, wherein the bin opening is dimensioned such that some solid particles from said dipleg overflows through said annular port.

3. An apparatus for the fluid catalytic cracking of a hydrocarbon feed comprising:
a reactor vessel comprising a riser conversion zone defined by a vertically disposed elongated tubular conduit having an upstream end and a downstream end, said downstream end terminating within said reactor vessel;
means defining a catalyst stripping zone within said reactor vessel;
means for introducing a suspension of hydrocarbon feed and catalyst into an upstream end of said riser conversion zone to produce a mixture of catalyst and cracked hydrocarbon feed exiting from the downstream end of said riser conversion zone;
means for introducing a stripping gas into said stripping zone;
a riser cyclone separator;
a first enclosed conduit connecting said riser cyclone separator to said downstream end of said riser conversion zone, said first conduit completely separating the material conducted therein from the atmosphere of said reactor vessel, said riser cyclone separator further including a dipleg for conducting catalyst from said riser conversion zone to said catalyst stripping zone;
a primary cyclone separator;
a second conduit connecting said primary cyclone separator to an outlet of said riser cyclone separator said primary cyclone separator further including a dipleg for conducting catalyst from said primary cyclone separator to said catalyst stripping zone;
means for conducting cracked hydrocarbons, from an outlet of said primary cyclone separator and from said reactor vessel;
means for sealing each of said riser cyclone dipleg and said primary cyclone dipleg;
said second conduit defining an annular port for passing at least a portion of the stripping gas from said catalyst stripping zone directly into said second conduit.

4. An apparatus of claim 3, wherein said second conduit includes a first portion and a second portion having a larger diameter than the first portion and being spaced therefrom, the spacing between said first and second portions defining said annular port.

5. An apparatus of claim 4, wherein said first portion of said second conduit is inserted into said second portion of said second conduit, wherein said first and second portions of said second conduit are vertically arranged, whereby a vertical portion of said second conduit defines said annular port.

6. An apparatus of claim 5, wherein said first annular port is sized to allow stripping gas velocities to enter therein from about 5 to about 100 feet per second.

7. An apparatus of claim 5, further comprising a means for aligning and maintaining the spacing of first and second portions.

8. An apparatus of claim 7, wherein said means for aligning comprises a packing means which partially fills said first annular port.

9. An apparatus of claim 7, wherein said means for aligning comprises mechanical spacers which interconnect said first and second portions which partially fill said first annular port.

10. An apparatus for the fluid catalytic cracking of a hydrocarbon feed, comprising:
- a reactor vessel comprising a riser conversion zone defined by a vertically disposed elongated tubular conduit having an upstream end and a downstream end, said downstream end terminating within said reactor vessel;
- means defining a catalyst stripping zone;
- means for introducing a suspension of hydrocarbon feed and catalyst into said upstream end of said riser conversion zone to produce a mixture of catalyst and cracked hydrocarbon feed exiting from said downstream end of said riser conversion zone;
- means for introducing a stripping gas into said stripping zone;
- a riser cyclone separator;
- a first enclosed conduit connecting said riser cyclone separator to said downstream end of said riser conversion zone, said first conduit completely separating the material conducted therein from the atmosphere of said reactor vessel; said riser cyclone separator further including a dipleg for conducting catalyst from said riser conversion zone to said catalyst stripping zone;
- a primary cyclone separator;
- a second conduit connecting said primary cyclone separator to an outlet of said riser cyclone separator, said primary cyclone separator further including a dipleg for conducting catalyst from said primary cyclone separator to said catalyst stripping zone,
- means for conducting cracked hydrocarbon from an outlet of said primary cyclone separator and from said reactor vessel;
- said second conduit defining a first annular port for passing at least a portion the stripping gas from said catalyst stripping zone directly into said second conduit;
- wherein each of said diplegs includes means defining a lower opening and each of said diplegs further includes a dipleg seal means located at the lower opening of each said dipleg, each of said dipleg seal means comprising vertical side walls, an upper portion of which overlaps a lower portion of its respective cyclone separator dipleg to define a second annular port located above the lower opening of said respective cyclone separator dipleg, a bin portion comprising vertical, inwardly slanted walls attached to a lower portion of the side walls, and means defining an opening at a lower end of said bin portion.

11. An apparatus of claim 10, wherein the bin opening is dimensioned such that some catalyst from said dipleg overflows through the second annular port.

12. An apparatus for the fluid catalytic cracking of a hydrocarbon feed comprising:
- a reactor vessel comprising a riser conversion zone defined by a vertical disposed elongated tubular conduit having an upstream end and a downstream end, said downstream end terminating within said reactor vessel;
- means defining a catalyst stripping zone within said reactor vessel;
- means for introducing a suspension of hydrocarbon feed and catalyst into an upstream end of said riser conversion zone to produce a mixture of catalyst and cracked hydrocarbon feed exiting from the downstream end of said riser conversion zone;
- means for introducing a stripping gas into said stripping zone;
- a riser cyclone separator;
- a first enclosed conduit connecting said riser cyclone separator to said downstream end of said riser conversion zone, said first conduit completely separating the material conducted therein from the atmosphere of said reactor vessel; said riser cyclone separator further including a dipleg for conducting catalyst from said riser conversion zone to said catalyst stripping zone;
- a primary cyclone separator;
- a second conduit connecting said primary cyclone separator to an outlet of said riser cyclone separator, said primary cyclone separator further including a dipleg for conducting catalyst from said primary cyclone separator to said catalyst stripping zone,
- means for conducting cracked hydrocarbons from an outlet of said primary cyclone separator and from said reactor vessel;
- said second conduit defining a first annular port for passing at least a portion of a stripping gas from said catalyst stripping zone directly into said second conduit;
- wherein each of said diplegs includes means defining a lower opening and at least one of said diplegs further includes a dipleg seal means located at the lower opening of said at least one dipleg, each of said dipleg seal means comprising vertical side walls, an upper portion of which overlaps a lower portion of its respective cyclone separator dipleg to define a second annular port located above the lower opening of said respective cyclone separator dipleg, a bin portion comprising vertical, inwardly slanted walls attached to a lower portion of the side walls, and means defining an opening at a lower end of said bin portion.

13. An apparatus of claim 12, wherein the bin opening is dimensioned such that some catalyst overflows through said second annular port.

* * * * *